A. L. SHAW.
CONVEYER.
APPLICATION FILED NOV. 22, 1920.
1,422,002.
Patented July 4, 1922.
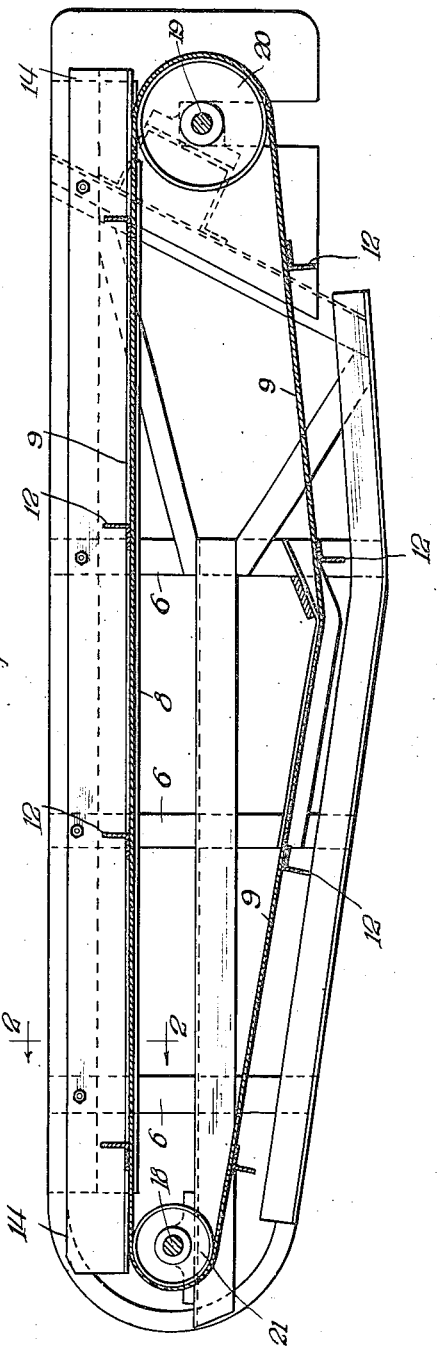
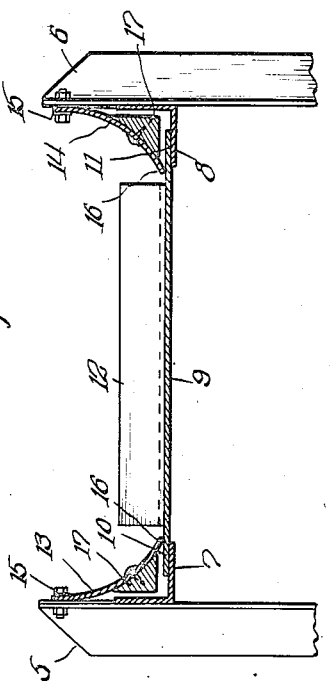
Inventor:
Arthur L. Shaw

UNITED STATES PATENT OFFICE.

ARTHUR L. SHAW, OF CHICAGO, ILLINOIS, ASSIGNOR TO CHICAGO AUTOMATIC CONVEYOR CO., A CORPORATION OF ILLINOIS.

CONVEYER.

1,422,002.　　　　　Specification of Letters Patent.　　Patented July 4, 1922.

Application filed November 22, 1920. Serial No. 425,619.

*To all whom it may concern:*

Be it known that I, ARTHUR L. SHAW, a citizen of the United States, residing at Chicago, in the county of Cook and State of Illinois, have invented certain new and useful Improvements in Conveyers, of which the following is a specification.

The invention relates to improvements in conveyers.

One of the objects of the invention is to provide a laterally disposed, longitudinally continuous material guide for belt conveyers extending vertically above the belt and having its lower edge inturned in contact with the belt margins near each of its respective edges to prevent material from dropping off the edges of the conveyer belt, while in transit.

Another object is to provide a fixed flexible guide, at the edges of the belt conveyer, to form with the belt thereof a trough-like conveyer, the side edges of which are curved inwardly but which are longitudinally immovable, the bottom edges of the guides being in contact with the moving edges of the conveyer belt and being sufficiently flexible to maintain contact therewith.

Other, further and more specific objects of the invention will become readily apparent, to persons skilled in the art, from a consideration of the following description, when taken in conjunction with the drawings, wherein:—

Fig. 1 is a vertical longitudinal section of a typical conveyer showing my invention applied thereto.

Fig. 2 is an enlarged cross-section taken on line 2—2 of Fig. 1.

In both views the same reference characters are employed to indicate similar parts.

The frame of the conveyer is provided with side frame members having vertical posts 5 and 6, respectively, located at intervals, as more clearly shown in Fig. 1.

Secured to the posts 5 and 6, respectively, are angle bars 7 and 8 with their horizontal legs inturned and the vertical legs directly secured to the posts by any suitable means. These legs afford continuous supports for the marginal edges of the conveyer belt.

The conveyer belt 9, which is substantially flat, is adapted to overlap and overlie the inner edges of the horizontal legs 7 and 8, as shown at 10 and 11, respectively, in Fig. 2, Secured at intervals to the conveyer belt 9, are drags 12, consisting, preferably, of angle irons with their horizontal legs directly secured to the belt and the other leg extending perpendicular thereof.

So far as described, the structure is old in the art, the angle irons 7 and 8 being intended as means for preventing the material, being conveyed by the belt 9, from spilling over the edges, but the trouble with such structures is that the material will crowd under the edges of the conveyer belt due to the deposit on the angle bars and finally will spill off the edge of the legs 7 and 8 and, furthermore, it has the effect of curling up the edges of the belt and causing even greater leak. I have found, from experience, that if flexible guides, 13 and 14, be secured at their upper edges, as at 15, to a suitable structure of the conveyer, and their inwardly turned edges 16 rest upon the respective edges of the conveyer belt that material cannot spill from the belt and owing to the inclination of the guides, 13 and 14, the material will not pile up at the edges of the conveyer belt but will be retained thereon. In order to render the guides 13 and 14 more stable, I prefer to place a strip of wood 17, or the like, curved on its contacting edges and having sufficient rigidity and body to hold the guide in its proper place and prevent it from crowding back against the frame of the conveyer. The guides, 13 and 14, are made preferably of leather or rubber belting. A two-ply rubber belt, five or six inches wide, has been found to answer the purpose quite well and the point where it contacts the edge of the conveyer belt, a proper lubricant may be applied, one that does not have a deteriorating effect upon the substance of the belt or guides.

The guide, on each side of the conveyer, is extended beyond the axes 18 and 19 of the driven and driving pulleys so as to insure the integrity of the conveyer belt beyond these points.

The strip 17 extends vertically above the edge of the belt so that the guide 13 or 14, when secured thereto, cannot be pressed back of the edge of the belt because the strip 17 will prevent further outward movement when it strikes the vertical leg of the angle bar 7 or 8, as the case may be. The guides 13 and 14, being flexible, will follow any departure of the belt 9 from a straight horizontal plane and this is especially true when there is any weight of material imposed upon the upper surface of the guides. The belt is preferably driven by either the pulley 20 or 21 at the receiving and discharge ends of the conveyer, respectively.

The guides may be applied to any belt conveyer designed to convey divided or comminuted material.

Having described my invention what I claim is:—

1. A conveyer having a travelling belt; continuing supports for the edge of the belt; a flexible guide having its lower edge resting on the margin of the belt and extending upwardly and outwardly therefrom, and means preventing lateral movement of the guide away from the belt.

2. A conveyer having a travelling belt; continuing supports for the edge of the belt; a flexible guide supported at its upper edge, having its lower edge resting on the margin of the belt and extending upwardly and outwardly therefrom to its supporting edge, and means preventing lateral movement of the guide away from the belt.

3. A conveyer having two side frame members; a travelling flat belt between the frame members; a continuous support for the margin edges of the travelling belt secured to the respective frame members, and a belt on each side of the travelling belt having its upper edge secured to the respective frame members and its lower edge resting on the travelling belt.

4. A belt conveyer having continuous supports for its marginal edges; a pulley at each end of the belt over which the belt passes; a flexible curved guide above the belt in contact with its marginal edges and supported near the top edge, said guide having a curved cross section with its outer side convex; and means secured to the guide to prevent lateral movement away from the belt, said means comprising a strip of rigid material arranged longitudinally and fastened to the mid-portion of the convex side of the guide.

In testimony whereof I hereunto subscribed my name.

ARTHUR L. SHAW.